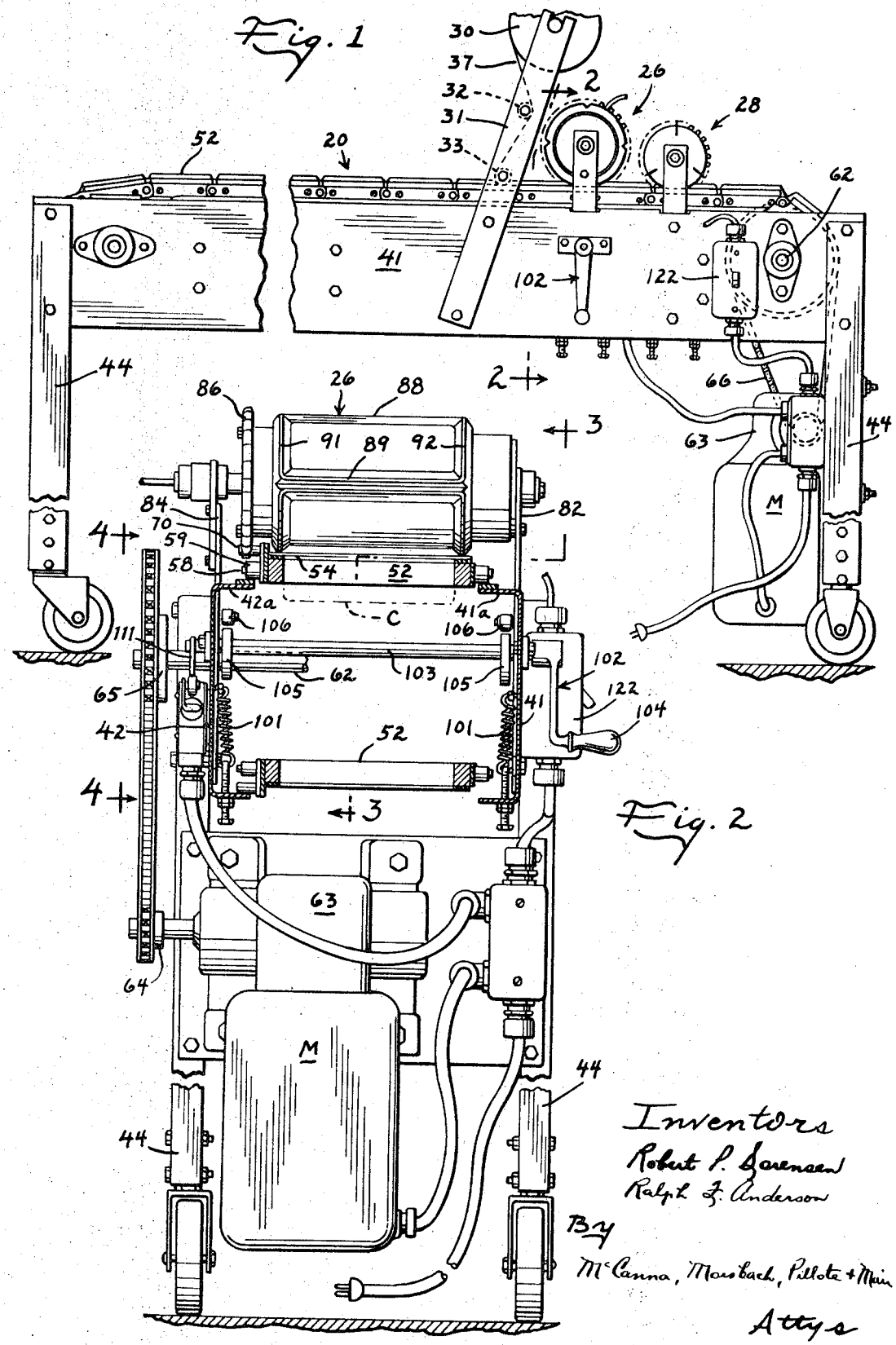

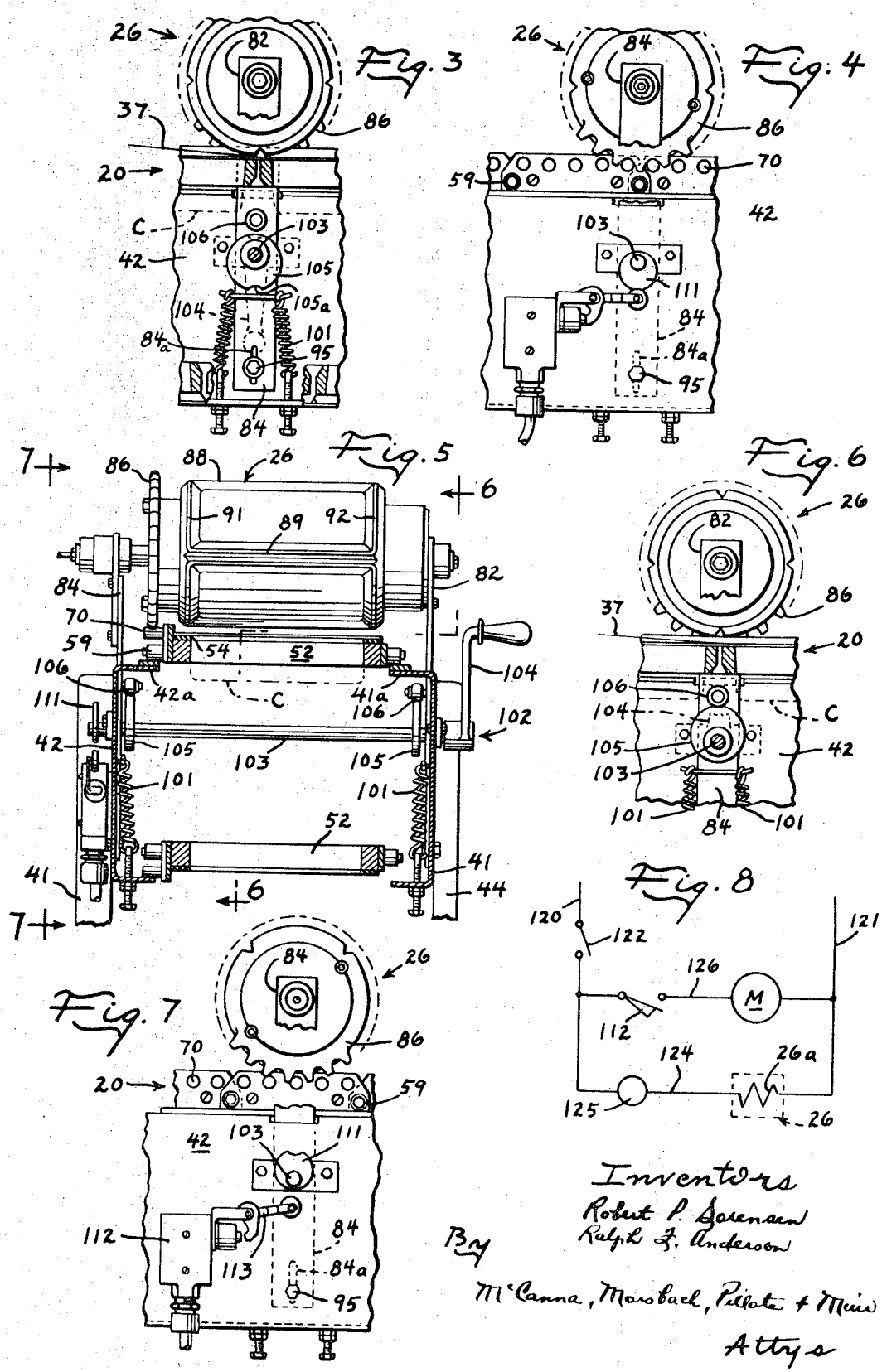

3,553,930
PACKAGING MACHINE

Ralph F. Anderson and Robert P. Sorensen, Rockford, Ill., assignors to Ralph F. Anderson, Rockford, Ill.
Filed Jan. 23, 1969, Ser. No. 793,360
Int. Cl. B65b 7/28
U.S. Cl. 53—77                 10 Claims

ABSTRACT OF THE DISCLOSURE

The machine includes an endless conveyor for advancing containers and a rotary sealing head for sealing a cover member to each container. A manually operated crank with cams is provided for moving the sealing head into and out of sealing position. The crank also controls actuation of the conveyor drive in correlation with moving the sealing head to provide continuous sealing through any stoppages.

BACKGROUND

The invention pertains generally to packaging and more particularly to a packaging machine for closing containers or filled receptacles by means of a sealing head.

Various packaging machines for closing containers or filled receptacles are known. Many of these are complex. In some instances, a simplified packaging machine is desirable; as for example, when economic considerations are paramount. Additionally, where the packaging operation experiences stoppages, it is desirable that continuity of the seal of the packages be assured through such stoppages.

SUMMARY

The present invention relates to packaging machines.

It is an object of the present invention to provide a simplified packaging machine in which the sealing head is moved between sealing and inoperative positions by manually operable means which also controls actuation of the conveyor.

Another object is to provide a packaging machine having a movable conveyor and a sealing head movable between sealing and inoperative positions, and so arranged that continuity of the sealing operation is assured even through any stoppages.

These, and other objects and advantages of the present invention, will become apparent as the same becomes better understood from the following detailed description when taken in conjunction with the accompanying drawings.

DRAWING

FIG. 1 is a front elevational view of a machine embodying the present invention;

FIG. 2 is a cross-sectional view taken generally along line 2—2 of FIG. 1 and on a large scale;

FIG. 3 is a partial longitudinal sectional view taken along broken line 3—3 of FIG. 2 and showing the crank position in phantom lines;

FIG. 4 is a partial rear elevational view as seen from line 4—4 of FIG. 2 and with parts broken away for better illustration;

FIG. 5 is a partial cross-sectional view similar to FIG. 2 but showing the relationship of the parts with the sealing head in inoperative position;

FIG. 6 is a partial longitudinal sectional view taken along broken line 6—6 of FIG. 5 and with a portion of the crank shown in phantom lines;

FIG. 7 is a partial rear elevational view as seen from line 7—7 of FIG. 5 and with parts broken away for better illustration; and FIG. 8 is a diagrammatic view of the electrical circuit.

DESCRIPTION

Reference is now made more particularly to the drawings which illustrate the best presently known mode of carrying out the invention and wherein similar reference characters indicate the same parts throughout the several views.

An apparatus embodying the present invention includes a conveyor 20 for advancing a number of containers C past a sealing head 26 and a cutter 28 to the outlet end of the machine. A supply of cover material, shown as a roll 30, is supported on the machine in any convenient manner as by a member 31. A web 37 is withdrawn from roll 30 and entrained over laterally extending rollers 32, 33 to a position overlying the container C. This web is sealed to the containers by means of the sealing head 26 and the packages are separated by cutting the web in an area between the adjacent containers as by the cutting means 28. The general structure of the machine conveniently includes channel-shaped side panels 41, 42 supported on legs 44.

In one preferred embodiment, sealing head 26 is arranged for heat sealing the web 37 to the container C. Thus, container C is preferably made of material capable of having a cover heat-sealed thereto. The cover or web 37 is preferably a thermoplastic material of any type compatible with the container and, by way of illustration, includes sheets of synthetic resin and sheets of paper or the like coated with a thermoplastic material.

The conveyor 20 includes a plurality of pockets 52 shaped for receiving the container C. As illustrated, the pockets may have tapered inner side walls and a generally open bottom. In the present embodiment, the pockets are shaped to support outwardly extending flanges of the container C on the upper surface 54 of the pockets. The upper surface preferably comprises a layer of resilient and heat insulating material 54 to aid in the sealing operation when heat-sealing is used. The pockets are swingably connected together in end-to-end relationship to form an endless-type conveyor. This is conveniently accomplished by pivotally connecting adjacent ends of the pockets as by pins 58 on which are mounted rollers 59. The upper flight of the conveyor is supported on flanges 41a, 42a of side panels 41, 42, respectively, and which are arranged for engagement by the rollers 59. In the present embodiment, the conveyor 20 is driven by a motor M. The motor drives a drive shaft 62 through a gear reducer 63 and sprockets 64 and 65 which are interconnected by a chain 66. In one suitable arrangement, star wheels (not shown) are mounted on drive shaft 62 and are arranged to engage the rollers 59 to provide a driving connection to the conveyor 20.

Attention is now directed more particularly to the construction of the pockets 52. As shown, adjacent the tops of the pockets are a plurality of generally equally spaced teeth shown in the form of laterally extending pins 70. It is deemed obvious that these pins 70 are advanced with the pockets 52, and a sprocket, such as at 86, may be engaged by the pins to drive the sealing head 26 or cutter 28. This arrangement provides a positive relationship between the driven apparatus and the conveyor since the pins or fingers 70 are positively located on each pocket 52 to provide a generally continuous rack. Other advantages of this arrangement will become apparent from the following description of the sealing head.

The sealing head 26 is rotatably mounted on upright support members 82 and 84. A sprocket 86 is secured to the sealing head 26 for rotation therewith and has radially extending teeth for engaging the pins 70 to rotate the sealing head as the conveyor is advanced. The sealing head 26 is made of heat-conductive material and, in the embodiment illustrated, conveniently has four sealing engagement means on its periphery for sealing covers on four consecutive containers. Each sealing engaging means is shaped for overlying the flanges of the container and includes laterally extending ribs 88 and 89, and longitudinally extending ribs 91 and 92.

The support members 82, 84 are slidably mounted on the side members 41, 42, respectively, for movement between a sealing position (FIGS. 2–4) and an inoperative position (FIGS. 5–7). The slidable mounting is conveniently accomplished by means of a slot, as at 84a, adjacent the bottom of the support member and a fastener 95 on the side member and passing through the slot. Means is provided for applying a resilient downward pressure on the sealing head to depress the web and flanges of he container C into resilient material 54 on pockets 52. In the embodiment illustrated, this means is in the form of a plurality of tension springs 101 having one end connected to the lower end of the support members 82 or 84 and the other end connected to the lower flanges of the side members 41 or 42.

A manually operable means is provided for moving the sealing head to its inoperative position against the force of the springs 101. This is adavntageously in the form of a laterally or transversely extending crank, generally designated 102. The crank includes a transversely extending shaft 103 rotatably mounted on side members 41 and 42 and a crank handle 104 conveniently located adjacent the front side of the machine, as best seen in FIG. 1. It is deemed obvious that movement of handle 104 rotates shaft 103. Levers in the form of cams 105 are secured to shaft 103 for movement therewith. Cam followers 106 are mounted on support members 82 and 84 for engagement by the cams 105 when the handle 104 is moved to an inoperative position as shown in phantom in FIG. 6. Each cam advantageously has a depression 105a (see FIG. 3) into which the follower 106 can set when the aperture is in inoperative position and thereby hold the crank at that position (see FIGS. 5 and 6). Thus, the manually operable apparatus operates to hold itself in the inoperative position. When the crank 104 is moved to operative position it will be noted that the cam folower 106 is spaced from the cam 105 (see FIGS. 2 and 3) and that the springs 101 are fully operative. It will be also noted that, when in the raised position, the radially extending fingers of sprocket 86 are still engaged with pins 70 (see FIGS. 5 and 7). In this manner, the synchronism between the sealing head 26 and the conveyor 20 is maintained through any movements of the sealing head between its sealing and inoperative positions.

The crank 102 also conveniently controls actuation of the conveyor 20. For this purpose, a third cam 111 is mounted on shaft 103 conveniently adjacent the back side of the machine for controlling the throw of a switch 112. In the present embodiment, switch 112 is conveniently a normally open switch which, in its open position, stops the flow of current to the motor M. A lever arm 113 closes switch 112 when engaged by cam 111 when the crank 102 is moved to the sealing position. The arrangement of the cams 105 and 111 is such as to provide a lost-motion relationship so that the switch 112 is actuated to its "off" position to interrupt the flow of current to the motor M and stop the conveyor 20 prior to moving the sealing head 26 from the sealing position. In other words, the conveyor 20 is stopped before the sealing head is moved away from its sealing position. Additionally, this relationship permits the sealing head 26 to be returned to its sealing position prior to actuating the switch 112 to "on" position and thereby start the conveyor 20. By this arrangement, the seal of the containers is continuous through any stoppages and this continuity is accomplished by the arrangement of the manually operable means.

Referring now to FIG. 8, the electric circuitry of the machine is illustrated. Power is provided through a supply line 120 and a return line 121. A manually operable switch 122 is interposed in line 120 to turn the machine on and off. This switch is conveniently mounted on front side member 41 as best seen in FIG. 1. When switch 122 is in its "on" position, power is supplied to a heating element 26a in sealing head 26 through line 124. A thermostat 125 is interposed in line 124 to control flow of current to the heating element 26a and maintain the sealing heat at the desired sealing temperature. Power is supplied to the motor M through line 126 in which is interposed the previously described switch 112. When it is desired to operate the machine, the crank 102 is moved to an "on" position with the handle 104 conveniently extending downward. This moves the sealing head to sealing position, and moves the switch 112 to "on" position to start the motor M and actuate the conveyor 20. Movement of the crank 102 to inoperative position with the handle 104 conveniently extending upwardly (see FIG. 5) first allows the switch 112 to move to open position and then moves the sealing head 26 to inoperative position.

It is now deemed obvious that the packaging machine of the present invention provides a simplified apparatus under the control of a manually operable means. It is also deemed obvious that the arrangement provides continuity of the sealing operation through any stoppages by reason of the unique cooperation of the various elements. This cooperation is between the operation of the controls, the movement of the sealing head, and the engagement of the sprocket teeth 86 with the pins 70 in the inoperative position.

While a preferred embodiment of the present invention has been described, this has been done by way of illustration and not limitation, and is to be understood that various modifications in structure will occur to a person skilled in the art.

What is claimed is:

1. In a packaging machine for packaging in open-topped containers and including a longitudinally extending conveyor for supporting the open-topped containers, drive means for driving the conveyor to advance the containers in a predetermined path, means for supplying and positioning a covering material adjacent the tops of the containers, and a sealing head in rolling engagement with the cover material in a sealing position for sealing the cover material to the containers and movable to an inoperative position out of engagement with the cover material, the improvement comprising: a support, means for rotatably mounting the sealing head on the support, means for slidably mounting the support on the machine, a spring resiliently urging the support in a direction to move the sealing head to the sealing position, manually operable means engaged with the support to move the sealing head to its inoperative position against the force of the spring, and switch means responsive to operation of the manually operable means for actuating the drive means when the sealing head is in sealing position and for reactuating the drive means when the sealing head is in inoperative position.

2. The combination of claim 1 wherein the support comprises a pair of transversely spaced members, and wherein the manually operable means includes a handle at one side of the machine, and a lever connected to the handel and being operatively connected to the spaced member to move the sealing head to its inoperative position when the handel is moved.

3. The combination of claim 1 wherein the support comprises a pair of transversely spaced members; wherein the manually operable means includes a transversely extending crank having a handle at one side of the machine, the crank being rotatable and having cam means thereon operatively engageable with the spaced members to move the sealing head to its inoperative position when the crank is rotated to one position, and the cam means controlling actuation of the switch means.

4. The combination of claim 3 wherein the crank and cam means provide a lost-motion relationship so that the switch means is actuated to off position to stop the conveyor prior to moving the sealing head from the sealing position and for returning the same to the sealing position prior to actuating the switch means to on position, thereby providing continuity of the sealing operation through any stoppages.

5. The combination of claim 4 wherein: the conveyor has a plurality of spaced teeth advanced therewith, the sealing head has a plurality of teeth meshing with the conveyor teeth for rotating the sealing head as the conveyor is advanced, and the sealing head teeth being so constructed and arranged that they are meshed with the conveyor teeth in both positions of the sealing head to assure said continuity of the sealing operation.

6. The combination of claim 5 wherein the cam means includes a pair of cams each adjacent one of the support members, and including a cam follower on each support member spaced from the cam in the sealing position of the sealing head so the sealing head is resiliently held thereat under pressure of the spring, and at least one of the cams having positioning means cooperable with the cam follower to position the sealing head at the inoperative position.

7. In a packaging machine for packaging in open-topped containers and including an endless conveyor for supporting the open-topped containers, drive means for driving the conveyor to advance the container in a predetermined path, means for supplying and positioning a covering material adjacent the tops of the containers, and a sealing head in rolling engagement with the cover material in a sealing position for sealing the cover material to the containers and movable to an inoperative position out of engagement with the cover material, the improvement comprising: manually operable means connected to the sealing head for moving the same between its positions, switch means on the machine for actuating the drive means in an on position and deactuating the drive means in an off position, and the manually operable means controlling actuation of the switch means between its positions so that the drive means is actuated when the sealing head is in sealing position and deactuated when the sealing head is in inoperative position.

8. A packaging machine as set forth in claim 7 including a support, and means for rotatably mounting the sealing head on the support; and wherein the manually operable means moves the support to move the sealing head between its positions, the manually operable means providing a lost motion between actuation of the switch means and moving the support for actuating the switch means to off position prior to moving the sealing head from the sealing position and for returning the same to the sealing position prior to actuating the switch means to on position, thereby providing a continuous seal through any stoppage.

9. A packaging machine as set forth in claim 7 including a pair of laterally spaced support members, means for rotatably mounting the sealing head on the support members, and means for movably mounting the support members on the machine; and wherein the manually operable means includes a laterally extending crank having a handle at one side of the machine, and means on the crank engageable with the support members for moving the same and thereby moving the sealing head between its positions.

10. A packaging machine as set forth in claim 9 including a cam follower on each support member; wherein the last-mentioned means includes a cam for engaging each cam follower and having positioning means cooperable with the cam follower to hold the crank with the sealing head at the inoperative position; and including a third cam on the crank for controlling actuation of the switch means, the third cam having positioning means cooperable with the switch means to hold the crank with the sealing head in sealing position.

References Cited
UNITED STATES PATENTS

| | | | |
|---|---|---|---|
| 3,197,940 | 8/1965 | Spangler | 53—329 |
| 3,325,969 | 6/1967 | Bemiss et al. | 53—329 |
| 3,436,844 | 4/1969 | Sorensen | 53—373X |
| 3,457,699 | 7/1969 | Kinney et al. | 53—373 |

THERON E. CONDON, Primary Examiner

R. L. SPRUILL, Assistant Examiner

U.S. Cl. X.R.

53—329, 373

PO-1050
(5/69)

UNITED STATES PATENT OFFICE
CERTIFICATE OF CORRECTION

Patent No. 3,553,930      Dated January 12, 1971

Inventor(s) Ralph F. Anderson and Robert P. Sorensen

It is certified that error appears in the above-identified patent and that said Letters Patent are hereby corrected as shown below:

Claim 1, column 4, line 55, "reactuating" should be -- deactuating --;

Claim 2, column 4, lines 62 and 64, "handel" should be -- handle --.

Signed and sealed this 3rd day of August 1971.

(SEAL)
Attest:

EDWARD M. FLETCHER, JR.      WILLIAM E. SCHUYLER, JR.
Attesting Officer      Commissioner of Patents